United States Patent
Buleon et al.

(10) Patent No.: US 8,475,134 B2
(45) Date of Patent: Jul. 2, 2013

(54) METHOD FOR FITTING AND PROTECTING A SENSOR ON A SUBSTRATE

(75) Inventors: Charly Buleon, Melun (FR); Frederic Leman, Montrouge (FR); Etienne Tulie, Soisy sur Seine (FR)

(73) Assignee: SNECMA, Paris (FR)

( * ) Notice: Subject to any disclaimer, the term of this patent is extended or adjusted under 35 U.S.C. 154(b) by 939 days.

(21) Appl. No.: 12/574,042

(22) Filed: Oct. 6, 2009

(65) Prior Publication Data

US 2010/0104420 A1    Apr. 29, 2010

(30) Foreign Application Priority Data

Oct. 24, 2008  (FR) ...................................... 08 05925

(51) Int. Cl.
*F01D 5/14*    (2006.01)

(52) U.S. Cl.
USPC ............................... 416/230; 415/118; 416/61

(58) Field of Classification Search
USPC ................. 29/889, 889.7; 415/118; 427/99.2, 427/126.1, 126.3, 126.4
See application file for complete search history.

(56) References Cited

U.S. PATENT DOCUMENTS

| | | | | |
|---|---|---|---|---|
| 2,350,073 A | * | 5/1944 | Simmons, Jr. | 338/2 |
| 3,197,335 A | * | 7/1965 | Leszynski | 338/308 |
| 3,203,321 A | * | 8/1965 | Rosen | 92/223 |
| 3,263,310 A | * | 8/1966 | Rosen | 29/888.042 |
| 3,929,018 A | * | 12/1975 | Turner | 374/158 |
| 4,104,605 A | * | 8/1978 | Boudreaux et al. | 338/2 |
| 4,125,738 A | * | 11/1978 | Nichols | 136/234 |
| 4,455,530 A | * | 6/1984 | Lee et al. | 324/446 |

FOREIGN PATENT DOCUMENTS

| | | |
|---|---|---|
| EP | 1 560 010 A1 | 8/2005 |
| FR | 2 909 759 | 6/2008 |

OTHER PUBLICATIONS

Lisa C. Martin et al., "Thin Film Sensors for Surface Measurements", International Congress on Instrumentation in Aerospace Simulation Facilities, vol. Conf. 19, pp. 196-203, XP010563985, Aug. 27, 2001.
U.S. Appl. No. 12/571,858, filed Oct. 1, 2009, Buleon, et al.
U.S. Appl. No. 12/571,613, filed Oct. 1, 2009, Buleon, et al.

* cited by examiner

*Primary Examiner* — Nathaniel Wiehe
*Assistant Examiner* — Sean J Younger
(74) *Attorney, Agent, or Firm* — Oblon, Spivak, McClelland, Maier & Neustadt, L.L.P.

(57) ABSTRACT

The method consists in depositing, by alumina spraying, an electrically insulating sublayer on the substrate, then in placing the sensor on the electrically insulating sublayer and finally in depositing, by alumina spraying, a cover layer on the sensor and the electrically insulating sublayer. It further includes, before the cover layer is deposited, a step in which an impermeable and thermally insulating cement is applied locally on wires of the sensor.

8 Claims, 1 Drawing Sheet

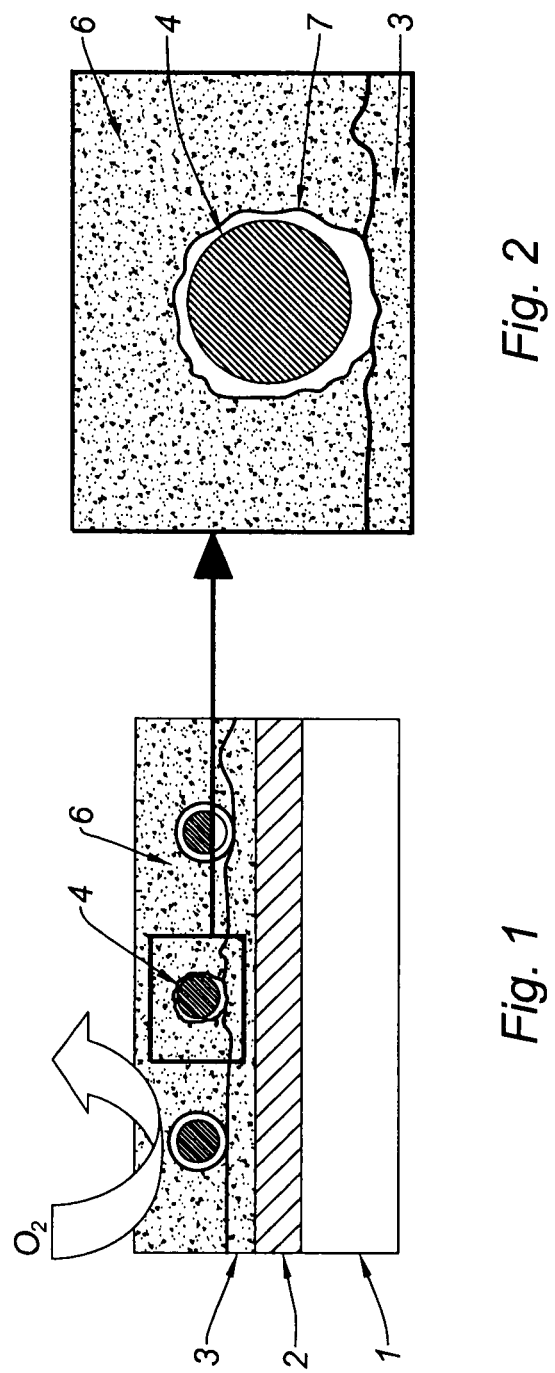

METHOD FOR FITTING AND PROTECTING A SENSOR ON A SUBSTRATE

BACKGROUND OF THE INVENTION

The present invention relates to a method for fitting and protecting a sensor on a substrate intended to be subjected to high temperatures, for example above 900° C., such as a turbomachine part.

The invention applies in particular to stationary parts (for example parts of combustion chambers) or to rotating parts (for example high-pressure and low-pressure turbine blades) which are subjected to high centrifugal forces coming from being rotated at high speed (around 20 000 rpm).

In the context of developing new turbojets and the certification thereof by the authorities, trials to be conducted require the bonding of sensors, such as strain gauges or thermocouples, for monitoring the mechanical and thermal behavior of the hot parts of the turbomachine. The sensors must be fixed onto the substrate and protected.

DESCRIPTION OF THE PRIOR ART

A known method of fitting a high-temperature strain gauge on turbomachine parts, described in patent application FR 2 909 759 in the name of the Applicant, consists essentially in depositing, by alumina flame spraying, an electrically insulating sublayer on the substrate intended to bear the gauge, then in placing the gauge on the electrically insulating sublayer and finally in depositing, by alumina flame spraying, a cover layer on the gauge and the electrically insulating sublayer.

Above 900° C., under trial conditions (namely with oil, kerosene and combustion gases), the alloy of commercially available gauges is strongly oxidized.

This is because, owing to the flame spraying, the alumina layers have a porous coarse-grained structure, which gives the coating a ductility suitable for hot deformation of the instrumented parts.

However, micrograph sections taken on a gauge after a trial have shown stronger oxidation of the sensor wires close to the interconnected microcracks and pores (and those emerging on the surface) of the alumina coating.

The increase in resistance due to this oxidation has been estimated at nearly 15%, which may result during the trial in an error of the same order of magnitude on the measurement.

In addition, the mechanical resistance of the gauge to vibratory stresses is also reduced, thereby limiting its lifetime.

Now, in current turbo-engines the temperatures are becoming higher and higher, and a turbo-engine certification campaign may be jeopardized should a substantial number of strain gauges or thermocouples be lost, and this may incur substantial financial losses because of delays to the program or penalties.

The aim of the present invention is to avoid these drawbacks by increasing the lifetime of the sensors and limiting the drift in their electrical properties during high-temperature trials.

SUMMARY OF THE INVENTION

For this purpose, one subject of the invention is a method for fitting and protecting a sensor on a substrate, which consists in depositing, by alumina spraying, an electrically insulating sublayer on said substrate, then in placing the sensor on said electrically insulating sublayer and finally in depositing, by alumina spraying, a cover layer on the sensor and the electrically insulating sublayer, said method being noteworthy in that it further includes, before the cover layer is deposited, a step in which an impermeable and thermally insulating cement is applied locally on connection wires of said sensor so as to encapsulate the wires of the sensor.

Thus, the inventive notion consists in applying, locally around the wires of the sensor, a cement which is impermeable and as insulating as alumina, so as to avoid the presence of pores near the wires of the sensor and the interconnection of the microcracks between the wires and the operating environment of the sensor, for the purpose of preventing the oxidizing atmosphere from reaching the wires of the sensor.

Advantageously, the cement may consist of a denser material than the encapsulating alumina deposited by thermal spraying, for example an alumina-based material.

According to one possibility, the step of applying the cement is followed by a step of depositing, by alumina spraying, a thin interlayer for fastening onto said sensor.

The cement may be applied by brush.

The sensor may be encapsulated beforehand with an air-impermeable substance before being fitted and protected by the encapsulating alumina.

Another subject of the invention is a turbomachine part provided with at least one sensor fitted by this method.

DESCRIPTION OF THE DRAWINGS

The invention will be better understood and other advantages thereof will become more clearly apparent in the light of the description of an embodiment, given by way of nonlimiting example and with reference to the appended drawings in which:

FIG. 1 is a schematic view showing, in cross section, a turbomachine part provided with a strain gauge fitted by a method according to the invention; and FIG. 2 is an enlarged view of a detail of FIG. 1.

DESCRIPTION OF THE PREFERRED EMBODIMENT

FIG. 1 shows a surface 1 of a turbomachine part (not shown), such as a rotating turbine blade made of a nickel superalloy (of any known type).

As described in patent application FR 2 909 759 in the name of the Applicant, the surface 1 was surmounted by a tie sublayer 2 of NiCrAlY alloy (22% chromium, 10% aluminum and 1.0% yttrium) so as to promote adhesion of an electrically insulating alumina sublayer 3 to which a strain gauge, illustrated by the section of its wires 4, was affixed, the whole assembly being covered with an alumina cover layer 6.

The alumina layers 3 and 6 were deposited by an oxyacetylene flame spraying method, while the alloy tie sublayer 2 was deposited by a plasma spraying method in an atmosphere so as to obtain a coating with 5 to 10% less porosity than that using flame spraying.

The invention differs from this known technique in that an impermeable and thermally insulating cement 7, consisting of a material denser than alumina, was applied locally by brush around the wires 4 of the gauge (see more particularly FIG. 2).

More particularly, the gauge is temporarily immobilized by means of an adhesive tape (not shown) and shims (not shown) which partially cover said gauge. It is just after this step of positioning the gauge that this localized encapsulation of the wires 4 of the gauge by the cement 7 is carried out.

The cement 7 prevents the oxidizing atmosphere from reaching the wires 4 of the gauge by limiting the porosity close to the wires 4. It is important for the application of the cement 7 to be limited to close to the wires 4, since the porosity of the alumina is an advantage in maintaining the ductility of the coating.

Once the wires 4 have thus been encapsulated, a much thinner alumina interlayer (not shown) may be sprayed onto the gauge in order to fasten it, thereby enabling the adhesive tape and the shim to be removed before the alumina cover layer 6 is deposited in order to ensure good mechanical strength and optimum insulation of the gauge.

The invention makes it possible to increase the lifetime of the sensors and reduce the drift in their electrical characteristics during trials at above 900° C.

The invention claimed is:

1. A method for fitting and protecting a sensor on a substrate intended to be subjected to high temperatures, above 900° C., comprising:
    depositing, by alumina spraying, an electrically insulating sublayer on said substrate;
    positioning and placing the sensor on said electrically insulating sublayer;
    immobilizing the sensor placed on said electrically insulating sublayer;
    applying an impermeable and thermally insulating cement locally on connection wires of the sensor so as to encapsulate the wires of the sensor; and
    depositing, by alumina spraying, a cover layer on the sensor, the encapsulated connection wires of the sensor, and the electrically insulating sublayer,
    wherein the cement is impermeable at a temperature above 900° C., is as insulating as alumina, and includes a material which is denser than the alumina of the cover layer.

2. The method for fitting and protecting a sensor as claimed in claim 1, wherein the step of applying the cement is followed by a step of depositing, by alumina spraying, a thin interlayer for fastening onto said sensor.

3. The method for fitting and protecting a sensor as claimed in claim 1, wherein the cement is applied by brush.

4. The method for fitting and protecting a sensor as claimed in claim 1, wherein the sensor is encapsulated in an air-impermeable substance before being fitted and protected by the encapsulating alumina.

5. A turbomachine part provided with at least one sensor fitted by a method as claimed in claim 1.

6. The method for fitting and protecting a sensor as claimed in claim 1, wherein the electrically insulating sublayer is deposited on a sublayer of NiCrAlY alloy.

7. The method for fitting and protecting a sensor as claimed in claim 1, wherein the sensor placed on said electrically insulating sublayer is immobilized by an adhesive tape and at least one shim which partially covers the sensor.

8. The method for fitting and protecting a sensor as claimed in claim 7, wherein the step of applying the cement is followed by a step of depositing, by alumina spraying, a thin interlayer for fastening onto said sensor, and removing the adhesive tape and the at least one shim prior to depositing the cover layer.

* * * * *